A. REITZ.
SAWMILL CARRIAGE SCRAPER.
APPLICATION FILED DEC. 29, 1909.
965,013.
Patented July 19, 1910.
2 SHEETS—SHEET 2.
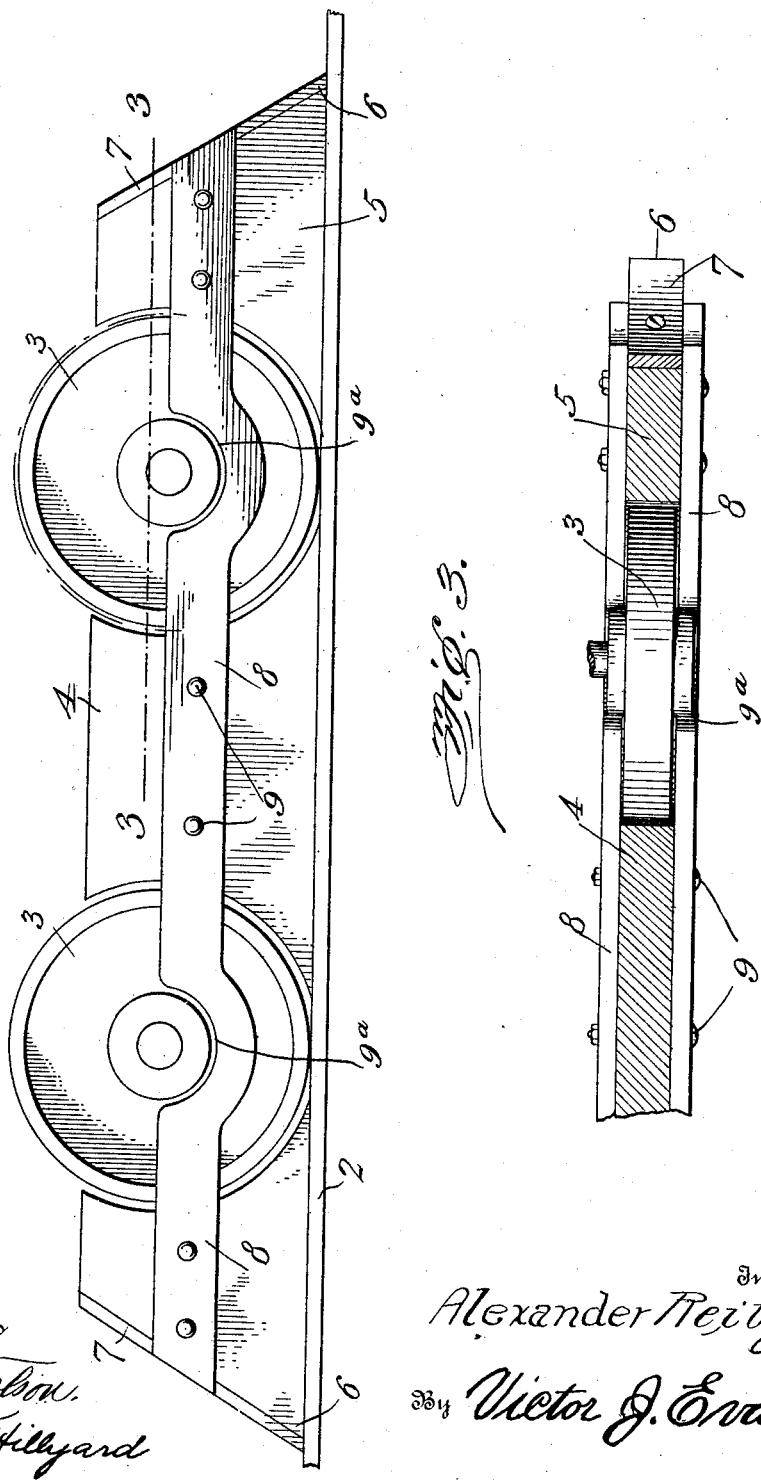
Witnesses
G. F. Tolson.
V. B. Hillyard
Inventor
Alexander Reitz.
By Victor J. Evans
Attorney

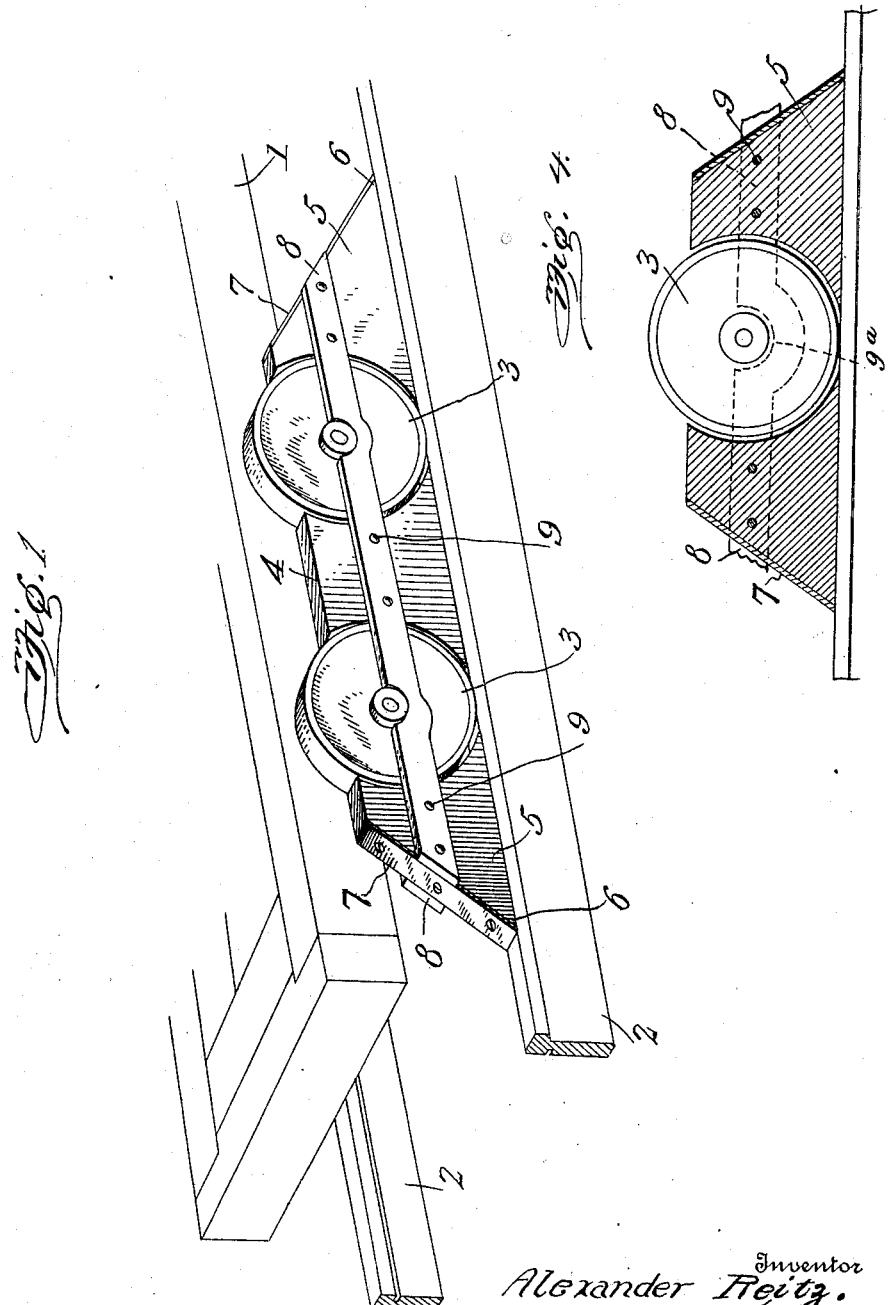

UNITED STATES PATENT OFFICE.

ALEXANDER REITZ, OF BOND, MARYLAND.

SAWMILL-CARRIAGE SCRAPER.

965,013.  Specification of Letters Patent.  Patented July 19, 1910.

Application filed December 29, 1909. Serial No. 535,508.

*To all whom it may concern:*

Be it known that I, ALEXANDER REITZ, a citizen of the United States, residing at Bond, in the county of Garrett and State of Maryland, have invented new and useful Improvements in Sawmill-Carriage Scrapers, of which the following is a specification.

The present invention provides means for keeping the track and the wheels of saw mill carriages free from sawdust and other obstructing matter, so that the carriage may run freely and smoothly without imparting any jar which may result in serious injury to the saw or in throwing the work out of true.

The invention is particularly designed for saw mill carriages upon which logs are placed either to be dressed or to be cut into slabs or boards, the invention consisting of a scraper mounted independently of the framework of the carriage and adapted to clean both the track and the wheels.

The invention contemplates a scraper which may be readily placed in position and which in operation will be effective and automatic in adapting itself to compensate for wear, thereby insuring a scraping both of the track and the wheels of the carriage no matter what may be the shape of the track or the wheels mounted thereon.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a perspective view of a portion of a track and a saw mill carriage equipped with a scraper embodying the invention. Fig. 2 is a side elevation of the scraper, showing it applied to a pair of wheels of a saw mill carriage. Fig. 3 is a horizontal section on the line 3—3 of Fig. 2. Fig. 4 is a vertical longitudinal section of a modification, illustrating the form of scraper adapted for a single wheel.

Corresponding and like parts are referred to in the following description, and indicated in all the views of the drawings, by the same reference characters.

The framework of the saw mill carriage is indicated at 1 and 2 designates the rails of the track. The supporting wheels of the carriage are indicated at 3.

The scraper consists of a series of blocks connected by bars, the latter being arranged upon opposite sides of the wheels 3 so as to prevent lateral displacement of the scraper. The blocks correspond in thickness to the width of the wheels 3 so that the connecting bars may extend along opposite sides of the wheels and touch the same lightly, thereby preventing lateral displacement of the scraper and yet admitting of the wheels 3 turning freely. The edges of the blocks facing the treads of the wheels conform to said treads both circumferentially and transversely and the same is true of the lower edges of the blocks adjacent the heads of the rails, with the result that both the wheels 3 and track rails are kept clear of sawdust and other matter tending to cling or lie thereon. Where a series of wheels have a single scraper constructed to coöperate therewith, as shown in Figs. 1 and 2, the intermediate block 4, has its opposite edges similarly formed to correspond with the outer edges of adjacent wheels, whereas the terminal blocks 5 have their inner edges made to conform to the treads of the wheels and their outer edges inclined so as to provide scraping edges or points 6. The scraping blocks preferably consist of wood and the inclined edges of the terminal blocks 5 are reinforced by means of metal straps 7. The longitudinal bars 8 connecting the blocks in series are located upon opposite sides of said blocks in transverse alinement and are secured to each other and to the blocks by bolts or fastenings 9 passing through registering openings formed in the several parts. The connecting bars 8 are depressed or formed with notches $9^a$ in their upper edges opposite the hubs or journals of the wheels so as to clear the same.

Where the scraper is intended for use with a single wheel, as illustrated in Fig. 4, two blocks 5 only are provided and are connected by means of bars 8 arranged upon opposite sides thereof and spaced apart to embrace opposite sides of the wheel 3, said bars being connected to each other and to the blocks by bolts or fastenings 9. The outer inclined edges of the blocks 5 are reinforced by strap irons 7, which are secured thereto.

It is to be understood that the scraper is wholly independent of the framework 1 of the carriage and is prevented from lateral displacement by means of the connecting bars 8 and from vertical displacement by reason of the blocks resting upon the rails of the track and by reason of the bars 8 extending across the hubs or journals of the wheels 3. Moreover, the edges of the blocks adjacent the treads of the wheels are made concave to conform thereto and embrace parts of the treads of the wheels both above and below the center, thereby limiting the vertical movement of the scraper. The scraper is loose and free to adapt itself both to the tread of the rails and to the tread of the carriage wheels, the scraper being moved along the track by the wheels engaging with the several blocks thereof. When the carriage moves in one direction the scraper is pushed along in the same direction by the wheels engaging the rear edges of the relatively forward blocks and upon the return travel of the carriage the scraper is moved rearward by the wheels of the carriage engaging the adjacent edges of the blocks previously in the rear. The treads of the wheels and rails are kept clean and free from obstructing matter by rubbing of the scraper blocks thereon. The scraper may be assembled and placed in position by fitting the blocks between and upon opposite sides of the wheels, after which the connecting bars are placed in position upon opposite sides of the blocks and wheels and connected by passing the bolts or fastenings 9 through openings formed in said connecting bars and blocks.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

The herein described scraper for the wheels of a saw mill carriage and for the supporting track upon which said carriage is arranged to run, said scraper consisting of a series of wooden blocks arranged to come upon opposite sides of the carriage supporting wheels and having the inner edges of adjacent blocks made to conform to the treads of the wheels, the outer edges of the outer blocks being oppositely inclined, reinforcing irons secured to the said inclined edges of the outer blocks, and connecting bars arranged upon opposite sides of the blocks and secured to each other and to the blocks, said connecting bars having depressions in their upper edges at points opposite the hubs or journals of the carriage supporting wheels.

In testimony whereof I affix my signature in presence of two witnesses.

ALEXANDER REITZ.

Witnesses:
ANNIE TREACY,
JAMES P. TREACY.